United States Patent [19]

Janssen et al.

[11] 4,229,774

[45] Oct. 21, 1980

[54] SELF-ADAPTING FLOW RESTRICTORS

[75] Inventors: Donovan M. Janssen, Boulder, Colo.;
Anton J. Radman, Jr., Tucson, Ariz.;
William S. Seaward, Boulder, Colo.

[73] Assignee: International Business Machines Corporation, Armonk, N.Y.

[21] Appl. No.: 44

[22] Filed: Jan. 2, 1979

[51] Int. Cl.³ .................. G11B 5/016; G11B 15/64
[52] U.S. Cl. ............................. 360/98; 360/102; 360/135; 360/99
[58] Field of Search .............. 360/99, 98, 102, 135

[56] References Cited

U.S. PATENT DOCUMENTS

| | | | |
|---|---|---|---|
| 3,208,056 | 9/1965 | Pearson et al. | 360/99 |
| 4,011,590 | 3/1977 | Orlando | 360/99 |
| 4,019,204 | 4/1977 | Griffiths et al. | 360/99 |
| 4,051,541 | 9/1977 | McGinniss et al. | 360/99 |
| 4,167,029 | 9/1979 | Ragle et al. | 360/99 |

FOREIGN PATENT DOCUMENTS 2442536  5/1975  Fed. Rep. of Germany ............ 360/99

OTHER PUBLICATIONS

IBM/TDB, vol. 17, No. 1, Jun. '74, "Self-Ventilating Storage Disk Apparatus" by Griffiths et al.
IBM/TDB, vol. 16, No. 12, May, '74, "Record Disk Assies", by Griffiths et al.

*Primary Examiner*—John H. Wolff
*Attorney, Agent, or Firm*—Herbert F. Somermeyer

[57] ABSTRACT

A record storage apparatus consisting of a stack of co-rotating spaced apart flexible record storage disks are stabilized by circumferentially uniform radially outwardly flowing air under a quiescent operating condition. The record storage disks are normally in a parallel relationship. To form a transducing access opening, the disks are axially partially moved to create an enlarged interstice between two of the record storage disks for enabling a transducer to reach a recording surface on one of the two record storage disks. Disks adjacent to such access openings come closer together but should not touch. To avoid the touching and maintain stability, air flow between such more closely spaced disks is automatically adjusted as the disks approach each other.

4 Claims, 4 Drawing Figures

SELF-ADAPTING FLOW RESTRICTORS

DOCUMENTS INCORPORATED BY REFERENCES

Griffiths et al, U.S. Pat. No. 4,019,204, illustrates an apparatus with which the present invention may be advantageously employed. The self-adaptation of the present invention substitutes for the fluid flow restrictions provided by piston 50 as illustrated in said U.S. patent.

Commonly-assigned co-pending application Laman Ser. No. 947,389 filed Oct. 2, 1978 shows variation of disk stack operation with changing environmental conditions and shows a compensating control for same.

BACKGROUND OF THE INVENTION

The present invention relates to record storage apparatus and more particularly to record storage apparatus having a plurality of stacks of co-rotating flexible record storage disks which are accessible by creating an enlarged axial interstice for enabling transducing access to a given record storage surface.

Record storage apparatus employing flexible record storage disks require good rotational stability under all operating conditions. Such rotational stability is varied under atmospheric conditions in which the apparatus resides. That is, as a transducer access opening is generated as set forth in the referenced U.S. patent, or by other means; the size of the opening as well as the spacing between adjacent ones of the record storage disks will vary with atmospheric conditions. Further, it is highly desired that the adjacent disks do not at any time come in contact. If non-contact is assured between adjacent record storage disks, then the relationship between the transducer and the record storage disk to be accessed can be more easily maintained in a desirable state. Accordingly, it is desired to provide control of such air flow as a function of the access opening, which in turn is determined for such storage apparatus by atmospheric conditions. In a broader sense, the stabilizing fluid flow control should be determined by parameters dependent upon the atmospheric conditions in which the record storage apparatus resides.

SUMMARY OF THE INVENTION

It is the object of the present invention to provide a self-adaptive flow control method and apparatus for use with a record storage apparatus of the flexible record storage disk type.

Record storage apparatus constructed in accordance with the invention includes a stack of co-rotating flexible record storage disks, each of which are spaced from each other. Means induce air flow into the interstices for stabilizing disk rotation. Such means are responsive to a parameter determined by the ambient atmospheric conditions for adjusting air flow in accordance with a transducer access opening whereby record storage disks immediately adjacent to said transducer access opening tend to remain in noncontact and in a stabilized rotational state. Such rotational state is preferably maintained by providing an adaptive reduction of fluid flow between adjacent ones of the disks whereby fluid flow continues between all disks. Such adaptive flow is provided by orifice means, preferably at a tubular spindle supporting such record storage disks, that are responsive to flexure of the disk along an axial direction for providing a fluid flow controlling action in accordance with the record disk flexure; the record disk flexure is a parameter indicating atmospheric conditions in which the record storage apparatus resides. No limitation to the spindle location for the orifice means is intended.

The foregoing and other objects, features, and advantages of the invention will now be apparent from the following more particular description of preferred embodiments of the invention as illustrated in the accompanying drawings.

DETAILED DESCRIPTION

Figure 1:
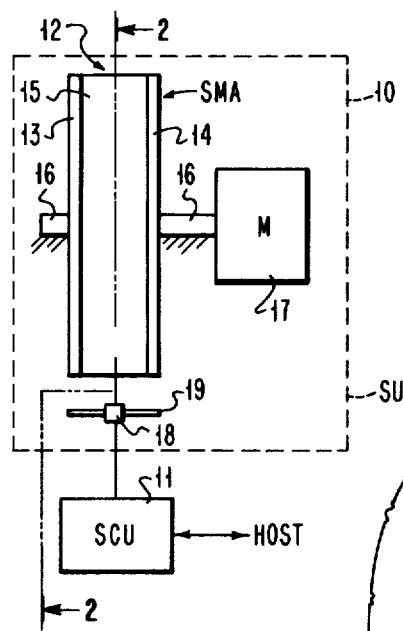
FIG. 1 is a diagrammatic showing of apparatus incorporating the invention.

Referring now more particularly to the drawings, like numerals indicate like parts and structural features in the various diagrams. A storage unit (SU) 10 is attached through the normal interconnection circuits to a storage control unit 11 (SCU), which in turn is connected to a host. SU 10 includes a storage media assembly SMA 12 which has capability for storing signals accessible by the host via SCU 11. SMA 12 includes a pair of end rigid stabilizing plates 13, 14 with a plurality of co-rotatably flexible record storage disks 15 disposed therebetween.

SMA 12 is mounted securely to shaft 16 rotated by drive motor 17 at a relatively constant rotational speed. Access to a selected one of the record storage disks 15 is via a transducer (not shown) mounted for radial motion on a carriage 18 which in turn is mounted for axial motions on a rail 19. Motor 17 is mounted on a frame (not shown) with rail 19.

In accordance with the invention, stabilizing air flow normally flowing radially outwardly between adjacent ones of the storage disks 15 is adaptively changed in the area of a transducer access opening (not shown). Such adaptive change tends to keep all record disks 15 out of contact. The operation of such access opening means is well known and is not at all pertinent to the practice of the present invention.

Figure 2:
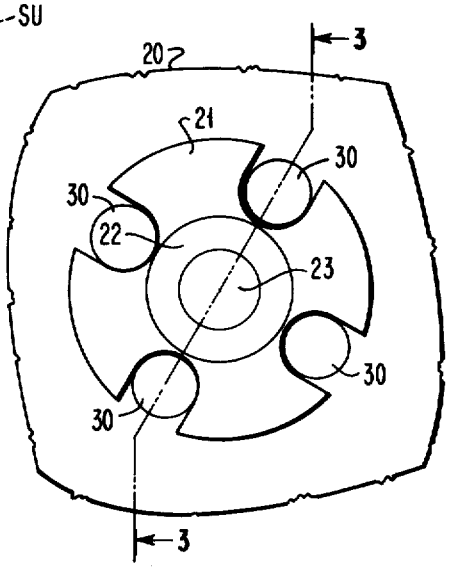
FIG. 2 is a diagrammatic sectional view taken along lines 2—2 in the direction of the arrows in FIG. 1 and showing an adaptive orifice forming spacer means in a disk separating space.
Figure 3:
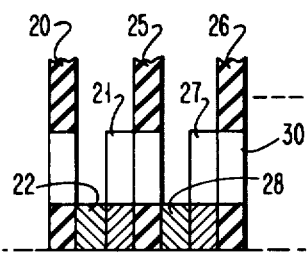
FIG. 3 is a diagrammatic sectional view taken in the direction of the arrows along line 3—3 of FIG. 2 detailing the adaptive disk spacer construction.
Figure 3:
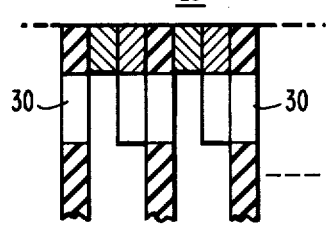
Figure 4:
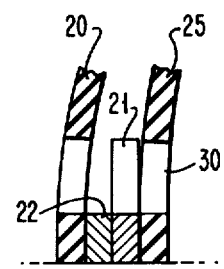
FIG. 4 is a diagrammatic showing of the self-adaptive air flow controlling action in accordance with the present invention.

The invention is better understood by referring in particular to FIGS. 2, 3 and 4, wherein record storage disks 20, 25 and 26 are selected ones of the disks 15. A pair of spacers are disposed between adjacent ones of the record storage disks—for example, spacers 21, 22 between disks 20 and 25. Spacer 21 is characterized in its preferred form by a plurality of radially outwardly extending flexible flanges which are circumferentially spaced apart to form air passageways therebetween.

Under all conditions of disks 20, 25 spacing, air from the air passageway 30 flows through disk 25 and spacer 21; then air flows radially outwardly between flanges 21, as shown in FIG. 4. If disk 20 is adjacent a transducer access opening, it moves axially, as shown, toward disk 25, which also moves axially, as shown. However, disk 20 will move axially more than disk 25, thereby reducing the axial interstice such that the axial space between disk 20 and controlling spacer 21 is reduced. This action has the effect of reducing air flow by increasing the fluidic resistance of the interstice between disks 20, 25. In a similar manner other adjacent disks have adapted air flow restrictions in accordance with the relative axial flexing of the interstice defining record storage disks. For example, between disks 25, 26 spacers 28 and 27 cooperate in the manner shown for FIG. 4. From the above it can be seen that the air flow controlling action applied to the interstice between the two disks 20, 25 immediately adjacent a transducer access opening will be greater than between the disks 25, 26 which are more remote from the transducer access opening. Therefore, the axial spacing between disks 20, 25 can be stabilized at a closer spaced apart relationship than between disks 25, 26. In accordance therewith it can be seen that the axial spacing between adjacent disks increases from a minimal spacing between the disk adjacent the transducer access opening to disks somewhat remote from the transducer access opening until a normal stabilized spacing occurs. This self-adaptive action varies with the environmental atmospheric conditions, such as pressure and temperature, in which SU 10 resides. Therefore, while the variable air restriction principles of identified U.S. Pat. No. 4,019,204 are still employed, the present invention provides an enhancement over that patent in that the air flow restriction adapts to environmental conditions for providing a greater control of spacing and stability of record storage disks immediately adjacent an enlarged transducer access axial interstice.

The adaptive restrictions to air flow tend to distribute air flow to all interstices in a predictable manner. This adaptive action tends to ensure sufficient air flow between all disks thereby preventing unintended disk contact with a resulting degradation of stabilized operation, that is, as any disk moves toward contacting an adjacent disk, air flow between the two disks is reduced. Such reduced air flow in turn reduces the pressure drop across the restrictor orifice resulting in increased interdisk air pressure. This increased air pressure tends to keep the two disks apart—hence preventing undesired contact. The term air includes any fluid for stabilizing rotation. Adaptive spacers can work with or without vent holes 30 in disks of stack 12; i.e., with a pressured stack or self-vented stack.

While the invention has been particularly shown and described with reference to preferred embodiments thereof, it will be understood by those skilled in the art that various changes in form and details may be made therein without departing from the spirit and scope of the invention.

We claim:

1. The method of operating a record storage apparatus having a plurality of axially spaced apart flexible storage disks with somewhat uniform axial interstices therebetween with transducer access being achieved by axially enlarging one of said axial interstices, the steps of:

reducing air flow between storage disks adjacent said transducer accessing enlarged interstice as a function of the axial spacing from said enlarged interstice, the closer the disk interstice is to said enlarged interstice, the greater the reduction of air flow, and adjusting said air flow reductions in accordance with environmental atmospheric conditions.

2. The apparatus set forth in claim 1 wherein said radially outwardly extending portion includes a plurality of radially extending circumferentially spaced apart flanges whereby air tends to flow radially at all times between said flanges.

3. Record storage apparatus having a plurality of axially spaced apart flexible record storage disks mounted on a spindle for corotation, said spindle having a plurality of radial air passageways aligned with spaces between said disks, respectively, such that air flows from said spindle radially past said disks to stabilize same during said corotation, the improvement comprising:

said spindle having a plurality of spacer means intermediate respective ones of said disks for determining said axial spacing and each said spacer means having a radially outwardly extending portion extending into a said respective space and being axially spaced from at least one of said disks defining said respective space whereby any axial enlargement of any one of said spaces in axial proximity to said respective space enables said one disk to axially flex along a given circle of said one disk, said given circle having a radius less than a maximal radius of said outwardly extending portion such that said respective spacing containing said spaced outwardly extending portion is further restricted by the relative axial flexure of said one disk with respect to said spaced outwardly extending portion to thereby restrict air flowing into said respective space in accordance with said flexure.

4. The method set forth in claim 1 further including the steps of adjusting said air flow reduction in accordance with axial flexure of said disks defining each individual ones of said interstices, respectively.

* * * * *